W. WITTKOPF.
LUBRICATOR.
APPLICATION FILED APR. 11, 1912.

1,060,303.

Patented Apr. 29, 1913.

Witnesses
W. W. Turner

Inventor
William Wittkopf
By Chas. A. Briscoe
Attorney

UNITED STATES PATENT OFFICE.

WILLIAM WITTKOPF, OF BALTIMORE, MARYLAND.

LUBRICATOR.

1,060,303.  Specification of Letters Patent.  Patented Apr. 29, 1913.

Application filed April 11, 1912. Serial No. 690,005.

*To all whom it may concern:*

Be it known that I, WILLIAM WITTKOPF, a citizen of the United States, residing at Baltimore, in the State of Maryland, have invented certain new and useful Improvements in Lubricators, of which the following is a specification.

My invention relates to lubricators for piston rods and the like and has for its object the provision of a device that will separate the oil from the water, arranged so that the water may be drawn off from the lubricating gland.

Figure 1:
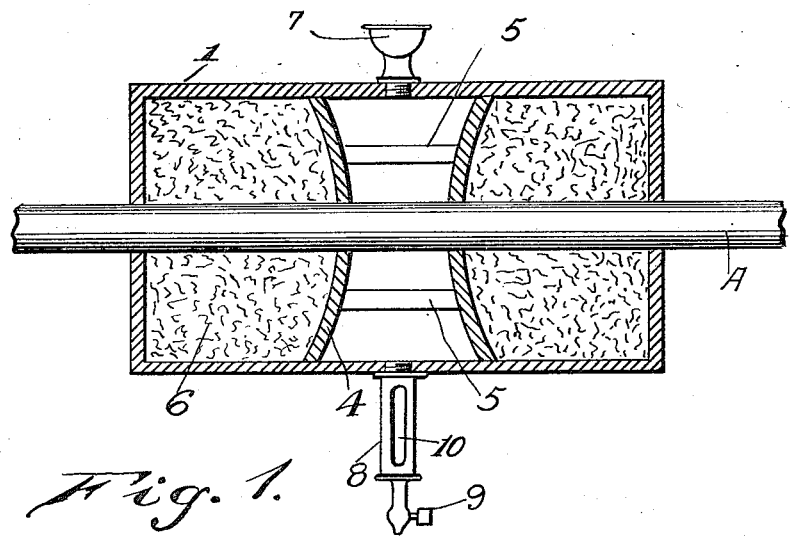
Figure 2:
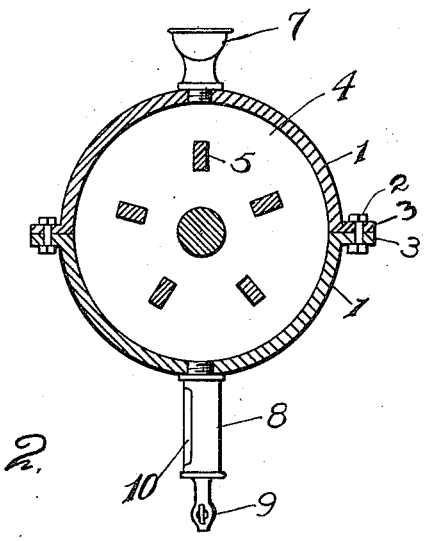

My invention will be described in detail hereinafter, and illustrated in the accompanying drawings, in which, Figure 1 is a longitudinal sectional view of my improved lubricating gland; and Fig. 2, a cross section.

In the drawings, similar reference characters are used to designate corresponding parts throughout the several views.

My improved lubricator consists of a casing 1 formed with two semi-cylindrical sections secured together by means of bolts 2, engaging flanges 3 extending from the edges of said cylindrical sections. The ends of the sections are provided with openings that receive the piston rod or other sliding member A.

Mounted centrally of the casing 1 are two concavo-convex disks 4 that are spaced apart by means of bars 5 engaging the convex sides of said disks. The ends of the casing are filled with packing 6.

Secured in the upper side of the upper portion of the casing 1 is an oil receptacle 7, and in the lower side of the lower portion of the casing a tubular container 8, having a draw-off valve 9 in its lower end and sight glasses 10 in its front side.

In use, the casing 1 is secured in the end of a piston of an engine or any other suitable place where a sliding member is to be lubricated, and the oil is poured into the receptacle 7, from whence it passes into the interior of the casing 1 and fills the space between the two disks 4 and lubricates the sliding member designated A in Fig. 1. The heavy portions of the oil and any water that may be contained therein settles to the bottom of the casing and passes into the tubular container 8 from whence it may be drawn by means of valve 9, the sight glass 10 enabling the engineer to ascertain when it is necessary to open the valve for the purpose of withdrawing the water or heavier portions of the oil.

Having thus described my invention, what I claim is:—

1. A lubricator comprising a cylindrical casing formed in two longitudinal parts secured together, concavo-convex disks mounted in said casing and having their convex sides presented toward one another, bars connecting said disks, the ends of the casing filled with packing, and means to supply a lubricant to said casing between said disks.

2. A lubricator comprising a cylindrical casing formed in two longitudinal parts secured together, concavo-convex disks mounted in said casing and having their convex sides presented toward one another, bars connecting the convex sides of said disks to space them apart, means to supply a lubricant to said casing between said disks, and a draw-off valve in the lower portion of said casing.

3. A lubricator comprising a cylindrical casing formed of two equal portions secured together, concavo-convex disks mounted in said casing and having their convex sides presented toward one another, bars connecting the convex sides of said disk to space them apart, packing mounted in the ends of said casing and engaging the concave sides of said disks, means to supply a lubricant to the interior of the casing and between said disks, a tubular container secured to the lower portion of said casing and having a draw-off valve mounted therein, and a sight glass in said tubular container.

In testimony whereof I affix my signature in presence of two witnesses.

WILLIAM WITTKOPF.

Witnesses:
GEO. W. LENNOX,
MARY C. E. GROENER.

---

Copies of this patent may be obtained for five cents each, by addressing the "Commissioner of Patents. Washington, D. C."